March 6, 1928.
H. C. GAMBLE
APPARATUS FOR TREATING COFFEE
Filed Jan. 3, 1922
1,661,796
4 Sheets-Sheet 2
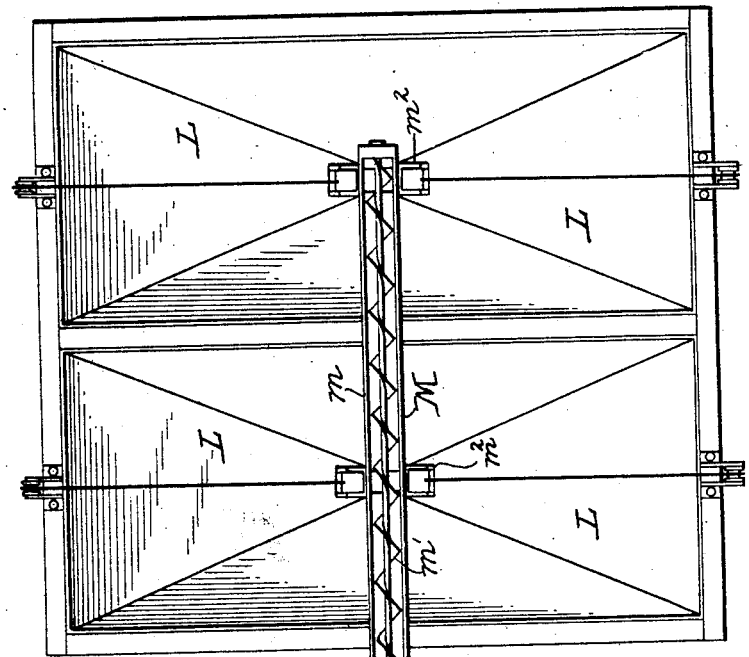
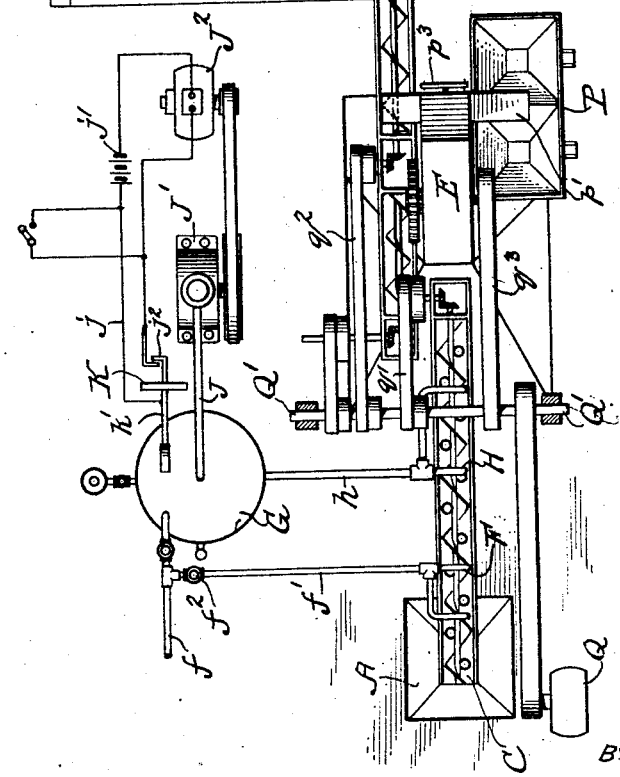
Fig. 2.
INVENTOR.
Harry C. Gamble
BY
Attorney.

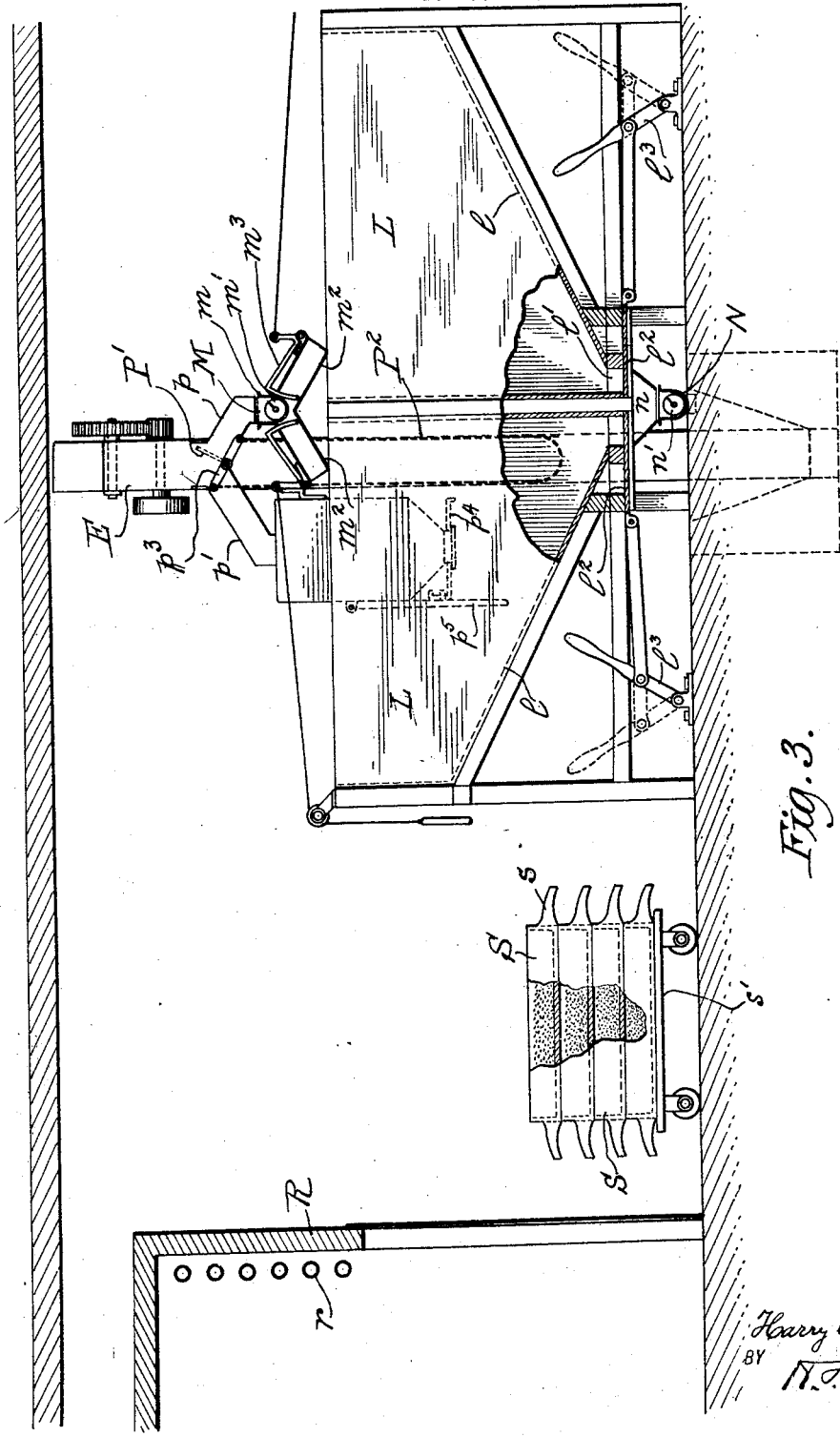

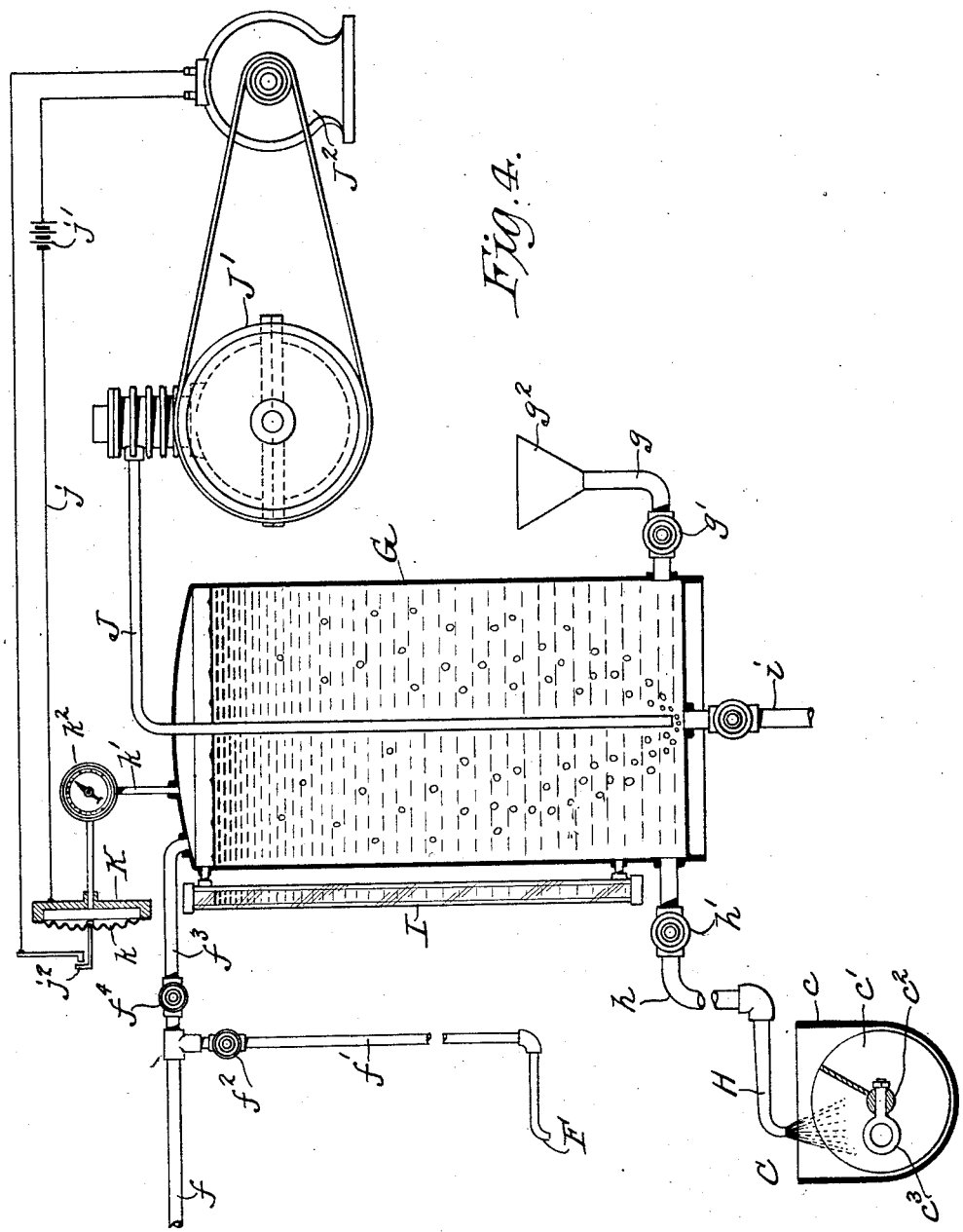

Patented Mar. 6, 1928.

1,661,796

UNITED STATES PATENT OFFICE.

HARRY C. GAMBLE, OF DETROIT, MICHIGAN, ASSIGNOR, BY MESNE ASSIGNMENTS, TO COFFEE RESEARCH COMPANY, OF ST. LOUIS, MISSOURI, A CORPORATION OF MISSOURI.

APPARATUS FOR TREATING COFFEE.

Application filed January 3, 1922. Serial No. 526,527.

This invention is an apparatus for treating a material, such as coffee, and while it may be used for according a desired treatment to various materials or products, it is adapted and intended for use, more particularly, in effecting the culture of coffee in its raw or green state with a view to ultimately ripening the resulting product, thereby improving the character and flavor of said product.

The objects of the invention are to handle the material in bulk, to preliminarily wash the material while in transit, to supply the culture in solution to said material, to transfer said material from one element to another of the apparatus, to effect the diffusion of the culture media within the liquid constituent of the solution, and to provide for the storage of the treated material under conditions which render effective the ripening of coffee, including enzymic action of the organisms which constitute the culture media.

An essential part of the apparatus is a spraying mechanism by which the culture media in solution is forcibly directed into contact with the material while in transit under the action of one conveyor of the plurality of conveyors embodied in the apparatus. By spraying the culture media in solution against the material while in transit, said solution is brought into intimate contact with the material, for the reason that the material is in a state of agitation, more or less, due to the transportation thereof and the culture media in solution is under pressure.

A further feature of the invention is a culture tank with means for separately feeding liquid and the culture media thereto, combined with a pressure pipe and an air compressor, whereby air under pressure is supplied to said tank below the level of the liquid therein so as to agitate the contents of said tank and ultimately to produce pressure of air therein to forcibly expel the resulting solution through said spraying mechanism, together with pressure-actuated controlling means for effecting the operation of a motor by which the air compressor is driven, whereby the motor and the air compressor are responsive to reduction in pressure within said tank so as to bring the air compressor automatically in service for restoring the pressure within the tank in order to feed the solution under pressure to the spraying means.

A further feature of the apparatus includes a storage bin or a plurality of such bins, an overfeed conveyor positioned over said bin or bins for handling the material in bulk and for feeding said material to a selected bin, a second conveyor in under feed relation to said bin or bins, and adapted to discharge the material to a receiving pit, and an elevator intermediate said pit and the overfeed conveyor, said elevator including a shiftable cut off by which the material may be directed into the overfeed conveyor or into a valved hopper from which the material may be discharged into culture trays or into bags or other receptacles.

A further feature consists of washing means for spraying the material with water while said material is in transit and at a stage preliminary to the application of the culture media in solution to said material, whereby foreign matter is washed out of the coffee and the latter is preliminarily moistened while in transit.

The apparatus of this invention further includes, in connection with means for feeding the culture media to the material and means for mechanically handling said material in bulk, a humidifying chamber provided with means for heating the same and means for maintaining the atmosphere therein in a desired humid condition, together with a plurality of tray-shaped receptacles adapted to contain the material (subjected to the culture media) in relatively thin layers and to store the same for a desired period of time within the humid and heated atmosphere of said humidifying chamber, whereby the material is allowed to remain at rest and under conditions of heat and moisture for the propagation of the organisms in effecting the operation of culturing said material.

The tray-like receptacles are adapted to be manually handled so as to fill the same with the material from the means for mechanically handling said material. They provide as well means for placing the material within the humidifying chamber and for removing the material from the same after the lapse of such an interval of time, usually three, four or five days, as is required, for the propagation of the mold growth thereon. Said trays in the service of the apparatus also afford means whereby the cultured product may be dumped into the pit of the elevator, the latter acting to carry the material to the overfeed conveyor by which the material in bulk is delivered to the storage bin wherein a mass of the cultured product is stored for an indefinite period of time so that the product is by enzymic action further cultured so as to effect the desired ripening of said product.

Other functions of the invention will appear from the following description taken in connection with the drawings, wherein—

Figure 2 is a plan view.

Figure 3 is an elevation with parts in transverse section illustrating a partial end view of the apparatus and a humidifying chamber contiguous thereto.

Figure 4 is an elevation with the culture tank and with the pressure regulator in section showing the relation thereto of the air compressor and the motor for driving the latter as well as the means for spraying the culture in solution upon the material during the transit thereof.

Figure 1:
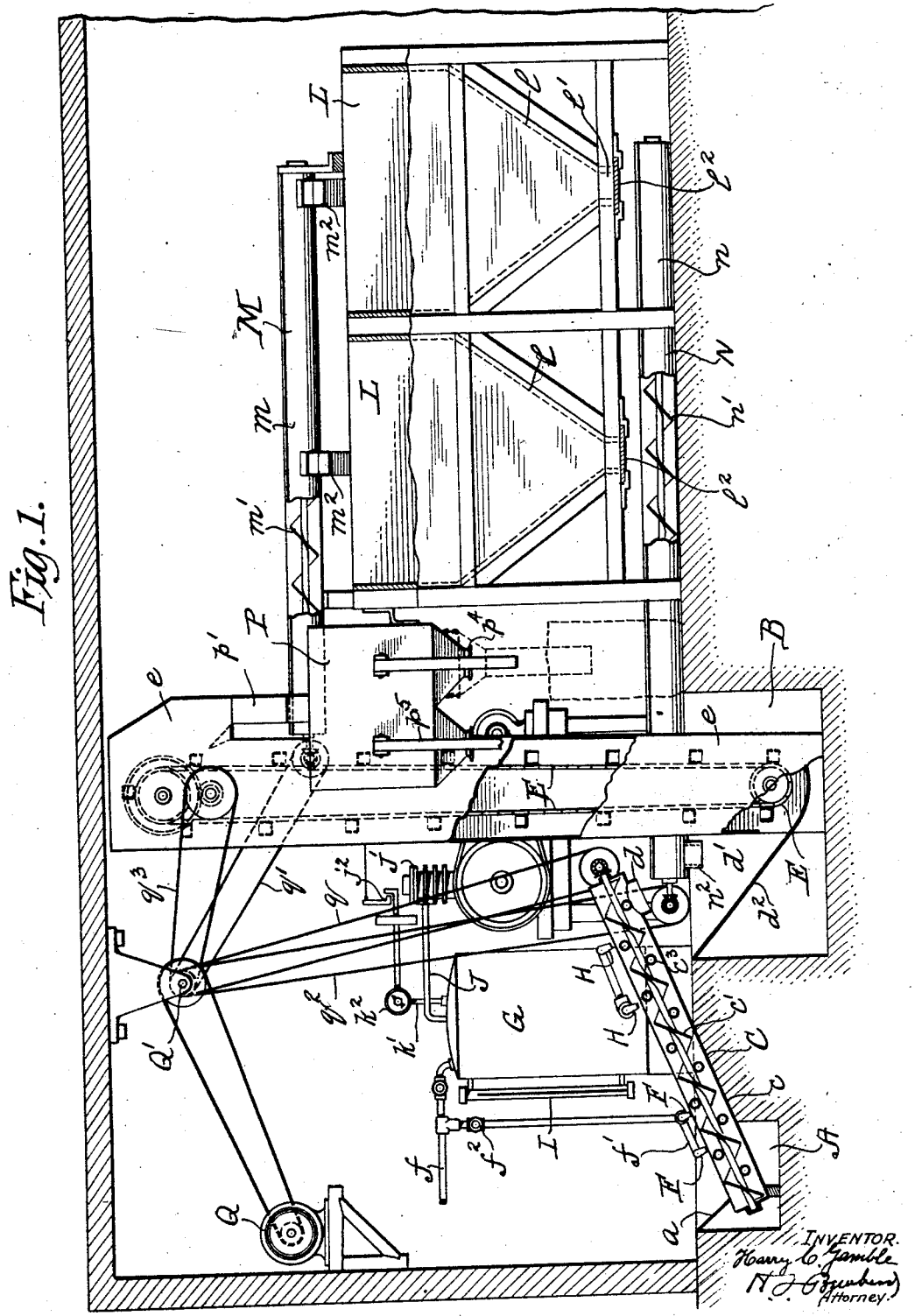
Figure 1 is a side elevation, with parts in vertical section, of an apparatus embodying my invention.

The apparatus shown in a practical form by the drawings includes a plurality of pits A, B, provided below the floor line $a$ of a suitable room. With said pits A B cooperates an inclined elevator C, preferably of the screw type, and shown as including a trough or casing $c$ and the screw conveyor $c'$, the shaft $c^2$ of which is provided with agitator members $c^3$, see Figures 1 and 4. The inclined elevator extends from pit A to pit B for the loading end of said elevator to receive the material adapted to be dumped into said pit A, whereas the delivery end of the inclined elevator discharges the material through an outlet $d$ into a chamber $d'$ of pit B, the bottom $d^2$ of said chamber being inclined relatively to the boot $e$ of an endless elevator E. As shown, the primary pit A, into which the material is first deposited by emptying said material from bags or other receptacles, is provided with an inclined bottom $a^x$ for feeding the material by gravity to the trough $c$ of the inclined elevator the screw $c'$ of which acts upon said material for conveying the latter within the trough and in an upwardly inclined path.

During the period that the material in bulk is undergoing transit by the action of the inclined elevator, the material is first washed by spraying it with liquid, such as water, and is thereafter sprayed with the culture media in solution.

The washing liquid is sprayed through nozzles F positioned over the inclined elevator C adjacent the loading end thereof, said liquid being supplied by a pipe $f$ from a suitable source of supply, and said pipe $f$ having a branch pipe $f'$ leading to the nozzles and the flow being controlled by a cock $f^2$.

The culture media in solution is prepared within, and stored for use within, a closed tank G, see Figures 1, 2 and 3. This tank is supplied with water from the pressure pipe $f$ through a branch connection $f^3$ having a suitable cock $f^4$, and to the tank is connected means for feeding the culture media to the chamber thereof, said feed means being shown as a pipe $g$ having a cock $g'$ and a funnel $g^2$, see Figure 4. The culture media is forcibly sprayed upon the material while the latter is present within the screw elevator C, and such spraying operation with the culture media in solution being performed subsequently to the initial washing operation. To this end, one or more spray nozzles H are positioned over the inclined elevator and intermediate the loading and delivery ends thereof, said spray nozzles being supplied by a pipe $h$, attached to the closed tank G at the bottom thereof, and said pipe being provided with a cock $h'$. As shown, the tank is provided with a valved drain $i$ and with a gage glass I, the latter indicating the liquid level within the tank.

Means are associated with the tank for agitating the solution therein and for ejecting or feeding said solution under pressure to the spray nozzles H. A pressure pipe J leads through the top of the tank so as to extend therein well towards the bottom of said tank, and the outer end of this pipe is coupled to an air compressor J', driven by a belt connection with an electric motor J² the field of which is in an electric circuit $j$ supplied with energy from an appropriate source $j'$ and opened or closed by a switch $j^2$ shown diagrammatically in Figure 4. The motor and the air compressor are at rest when the required pressure is established within the tank; but upon a decrease in pressure within the tank, the switch $j^2$ is operated by a regulator K for closing the circuit and energizing the motor so as to drive the compressor for feeding air through pipe J into the tank. Said regulator K is shown as comprising a chambered casing provided with a flexible diaphragm $k$, and connected by a pipe $k'$ with the tank above the liquid level therein. Said pipe $k'$ is shown as associated with a pressure gage $k^2$, whereas the diaphragm $k$ carries a movable member of the switch $j^2$ whereby the required pressure within the tank so influences the diaphragm as to open the switch and interrupt the circuit to the motor, but a decrease in the pressure within the tank is followed by an inward movement of the diaphragm for closing the switch $j^2$ and feeding current to the motor $J^2$.

L designates one, or a plurality, of storage bins shown as being erected adjacent the endless elevator E; M is an overfeed conveyor, and N is an underfeed conveyor. Said storage bin or bins are each provided with a hopper-like bottom $l$ having an outlet $l'$, controlled by a sliding gate $l^2$, to which movement is imparted by the manipulation of a lever $l^3$.

The overfeed conveyor is shown as comprising a casing $m$ and a conveyor screw $m'$, said conveyor occupying a horizontal position above the bins L. The loading end of the overfeed conveyor is below one chute $p$ of a plurality of inclined chutes $p$ $p'$ extending laterally from the boot $e$ of the endless elevator E, see Figure 3. Said casing $m$ of the overfeed conveyor is provided with discharge chutes $m^2$ controlled by gates $m^3$ and operated by suitable lines $m^4$, said chutes $m^2$ being positioned at intervals in the length of the conveyor casing and as being inclined toward the bins, whereby the overfeed conveyor may be controlled for feeding material in bulk to a selected bin of the series of bins L.

The endless elevator E is adapted to supply material either to the overfeed conveyor M or to a hopper P, the latter being supported in an elevated position at one side of the elevator. A directing gate P' is hung by a shaft $p^2$ in the elevator boot at the point of divergence of the chutes $p$ $p'$, said shaft having an arm $p^3$ to the ends of which are attached the end portions of an operating chain $P^2$, see Figure 3, whereby the gate P' may be shifted to the dotted line position of Figure 3 for directing the material into hopper P through chute $p'$, or the gate may be reversed to direct the material through chute $p$ into the overfeed conveyor M.

The underfeed conveyor N is horizontally positioned below the outlets $l'$ of the series of bins, and it extends below said bins to a point over the pit B, said delivery end of the conveyor being provided with a spout $n^2$ positioned for discharging the material into chamber $d'$ of the pit, whence the material passes to the elevator E. As shown, the underfeed conveyor is a casing $n$ and a conveyor screw $n'$, said casing being provided with a flaring portion (see Figure 3) in proximity to the outlets $l'$ of the series of bins.

Provision is made for driving all the conveyors and elevators from a motor Q belted to a countershaft Q'. From said countershaft run a plurality of belts, one of which $q$ drives a screwshaft of the inclined elevator C; another $q'$ drives the shaft of the overfeed conveyor M, a third $q^2$ drives the shaft of the underfeed conveyor N, and a fourth $q^3$ drives the head shaft of the bucket elevator E. As usual, suitable belt shifters are or may be provided for throwing the belts, or either of them, into and out of service.

In conjunction with this apparatus, I employ means for carrying forward the treatment of material subsequent to the period of its inoculation with the microorganisms contained in the culture solution sprayed upon the material by the spray nozzles H. Such means are shown in Figure 3 as a humidifying chamber R and trays S. Said chamber is provided with a steam equipment $r$ by which steam and heat may be supplied to the chamber for producing therein an atmosphere of the desired humidity and at a required temperature, the chamber being closed in a suitable manner against the ingress of the surrounding air.

Each tray S is a shallow receptacle provided with handles $s$, said trays being stacked in a desired number one upon the other, and being loaded usually on a truck $s'$ for transporting the loaded trays from the elevator E to the humidifier, or vice versa.

The operation is as follows:—The culture media in solution is prepared within the tank G by admitting water thereto through pipes $f$ $f^3$ and by feeding the culture media through pipe $g$, the water and culture media being mixed by agitating the liquid, for which purpose the compressor is operated by the motor for blowing air through pipe J until sufficient pressure is accumulated within the tank and above the liquid level therein, whereupon the diaphragm regulator K operates the switch to cut the motor out of the energizing circuit. At the beginning of the operation, the material, such as coffee in the green or raw state, is dumped into the pit A and elevators C E are started into service, the gate P' of the elevator boot $e$ being inclined to direct the material into hopper P. The material thus supplied to the elevator C from pit A is carried upward in an inclined path, and while in transit the material is washed by spraying it with water supplied through pipe $f$ $f'$, to nozzles F, the water being forced under pressure through the nozzles and into contact with the material so as to carry off the dirt and foreign matter, if any, and to moisten the material preliminarily to inoculating the same with the culture media in solution. At the stage of elevating the material by the inclined elevator C, it is sprayed with the culture media in solution supplied under pressure from tank G to spray nozzles H, and as the material is in a state of agitation due to the action of the screw conveyor and to the agitators, the solution under pressure penetrates into the mass of material for inoculating the same with the living microorganisms supplied to the solution by the culture media. The washed and inoculated material is delivered by the elevator C into chamber $d'$ of pit B, whence the material is supplied to the elevator E by which it is carried upwardly to chute $p'$ and thence deposited in hopper P. At this stage in the procedure, the workmen place the trays S one after the other below the hopper P so that the material is deposited within said trays in relatively thin layers, about four or five inches in thickness, and the loaded trays S are now placed upon the truck $s'$, by which the trays are carried into the chamber of the humidifier R. A desired number of trays containing the inoculated material having been deposited within the humidifier, the same is now closed, and steam is admitted for establishing an atmosphere of the desired humidity and temperature, in which atmosphere the material is allowed to remain for a period, varying from three to five days, for the propagation of the microorganisms and to establish a mold growth upon the material to an extent desired in order to culture the material with a view, in the treatment of raw or green coffee, to ripening such product so as to improve the character and flavor thereof. The desired mold growth on the coffee having been reached, the loaded trays S are removed from the humidifier, and such trays are carried to the pit B, whereupon the treated material is dumped from the trays into said pit. Elevator E and overfeed conveyor M are set into action and gate $P'$ is shifted for delivering the material through chute P. The treated material is carried by the elevator E to the chute $p$ which delivers the same to the conveyor M by which conveyor the material is delivered to a selected bin L of the series of bins. The material, inoculated with living microorganisms, is stored in bulk within a bin or bins, L, wherein said material remains for a desired length of time or until the same is to be distributed and used, and during this incubation period of storage within the bins the coffee mass is subjected to further treatment by enzymic action, the stored product developing heat and expanding in volume for a period of two or more days, following which the heat becomes dissipated and the bulk of the mass is reduced, due probably to a subsidence, at least in part, of such enzymic action. The material in bulk may now again be mechanically handled by opening the gates $l^2$ and bringing into service the underfeed conveyor N and elevator E, the former being loaded with the cultured product from the bins and discharging the same through spout $n^2$ into chamber $d'$ of the pit B, whereas the elevator E carries the product to the chute $p'$, and thence to the hopper P, the gate $P'$ having been adjusted to the inclined position of Figure 3. To bag the ripened coffee, or other product, the operator places the bags, one after the other below the hopper P, the gate $p^4$ of which is opened by lever $p^5$ for the product to run out of the hopper into the bags as the latter are placed in position.

My invention provides mechanism for handling coffee in bulk in an economical manner and for according to said coffee in a raw or green state the culture or treatment disclosed in a prior Patent No. 1,313,209, granted August 12, 1919, with a view to effecting the artificial ripening of such product within a relatively short period of time whereby the character and flavor of coffee are improved to a material extent.

Having thus fully described the invention, what I claim as new and desire to secure by Letters Patent is:

1. An apparatus of the class described embodying an elevator for transporting material in bulk, said elevator being provided with means in addition to the transporting elements for agitating said material during the period of its transportation, and means for spraying a culture media in solution into contact with said material during the period of the transportation and agitation of such material by said elevator.

2. An apparatus of the class described embodying a conveyor for transporting material in bulk and means in addition to the transporting elements for agitating said material during the transit thereof, and a succession of spray nozzles positioned contiguous to the path of said conveyor whereby a liquid or liquids may be supplied to said material during the periods of its transportation and agitation.

3. An apparatus of the class described embodying a conveyor for transporting material in bulk and means carried by the conveyor in addition to the transporting elements for agitating said material during the transit thereof, means for spraying a washing agent into contact with said material, and separate means for spraying a cultured media into contact with said material, said spraying operations being conducted while the material is in a state of agitation and during the transportation thereof.

4. An apparatus of the class described embodying a conveyor for transporting material in bulk and means carried by the conveyor in addition to the transporting elements for agitating said material during the transit thereof, a spray nozzle contiguous to the path of the material, means for supplying a washing agent to the spray nozzle, a second spray nozzle also contiguous to the path of the conveyor, and means for feeding a culture media in solution to the second spray nozzle.

In testimony whereof I have hereto signed my name this 27th day of December, 1921.

HARRY C. GAMBLE.